United States Patent [19]

Hayashi et al.

[11] 4,068,995
[45] Jan. 17, 1978

[54] INJECTION MOLDING MACHINE FOR THE MANUFACTURE OF SHOES

[76] Inventors: Hideki Hayashi, 380, Nonaka, Kurume, Fukuoka; Sadayoshi Ishii, 380, Tsubukuhon, Kurume, Fukuoka, both of Japan

[21] Appl. No.: 689,973
[22] Filed: May 26, 1976
[51] Int. Cl.² ............................................. B29F 1/10
[52] U.S. Cl. ................................. 425/129 S; 425/547
[58] Field of Search ................... 425/119, 129 S, 243

[56] References Cited

U.S. PATENT DOCUMENTS

| | | | |
|---|---|---|---|
| 2,478,005 | 8/1949 | Novotny | 425/243 X |
| 3,058,152 | 10/1962 | Eldred et al. | 425/119 |
| 3,199,149 | 8/1965 | Croyle | 425/119 |
| 3,225,388 | 12/1965 | Hansjosten | 425/119 |
| 3,667,883 | 6/1972 | Ludwig et al. | 425/119 |

Primary Examiner—Francis S. Husar
Assistant Examiner—W. R. Briggs
Attorney, Agent, or Firm—Fleit & Jacobson

[57] ABSTRACT

The invention provides improvements over such a conventional shoe-injection molding machine for molding a sole and attaching same to a prefabricated instep. It includes a stationary base plate, a machine frame made rigid therewith, a slide vertically movable on and along the machine frame, at least a head rotatable on the slide, a plurality of last supporting units adjustably mounted on the head and at least a sole mold assembly mounted on the base plate. According to the invention, the head is fitted with a liquid cooling system for cooling the latter from inside thereof. Further, an insulating sheet is provided between each of the last supporting units and the head for interrupting heat transmission from the unit to the head.

6 Claims, 5 Drawing Figures

4,068,995

INJECTION MOLDING MACHINE FOR THE MANUFACTURE OF SHOES

BACKGROUND OF THE INVENTION

This invention relates generally to shoe-making injection molding machines, and more specifically, it concerns with improvements in and relating to the shoe core or last supporting structure of such machines.

Such shoe-making injection molding machine is so designed and arranged as for molding a sole and attaching same to a prefabricated instep. Several similar molding steps are generally performed simultaneously or in an successive order one after another and on the same machine fitted with a plurality of the heads and the corresponding sole mold assemblies.

Much difficulties have been encountered with use of the above kind conventional machine on account of several main machine parts becoming hot during repeated and extended molding operations, resulting in localized thermal expansion of these parts distrubing especially smooth sliding and rotary movements of the relatively movable parts and substantial deterioration of the oil supplied thereto for optimum lubrication.

The main object of the present invention is, therefore, to provide an improved shoe-making injection molding machine wherein adversely affecting heat transfer from the sole mold assembly or assemblies to other main working parts of the machine is substantially reduced.

SUMMARY OF THE INVENTION

Starting from such shoe-injection molding machine for molding a sole and attaching same to a prefabricated instep and comprising a stationary base plate, a machine frame made rigid therewith, a slide vertically movable on and along said machine frame, at least a head rotable on said slide, a plurality of last supporting units adjustably mounted on said head and at least a sole mold assembly mounted on said base plate, the machine according to this invention is characterized by that said head is fitted with a liquid cooling system for cooling the latter from inside thereof and an insulating sheet is provided between each of said last supporting units and said head for interrupting heat transmission from the unit to said head.

The shoe-injection molding machine is further characterized by that an insulating sheet is provided between said sole mold assembly and said base plate.

The machine is still further characterized by that said liquid cooling system is made in common to a plurality of similar heads including said head.

These and further objects, features and advantages will become more apparent when read the following detailed description of the invention by way of a preferred embodiment thereof with reference to the accompanying drawings, in which:

DETAILED DESCRIPTION OF THE INVENTION

Figure 1:
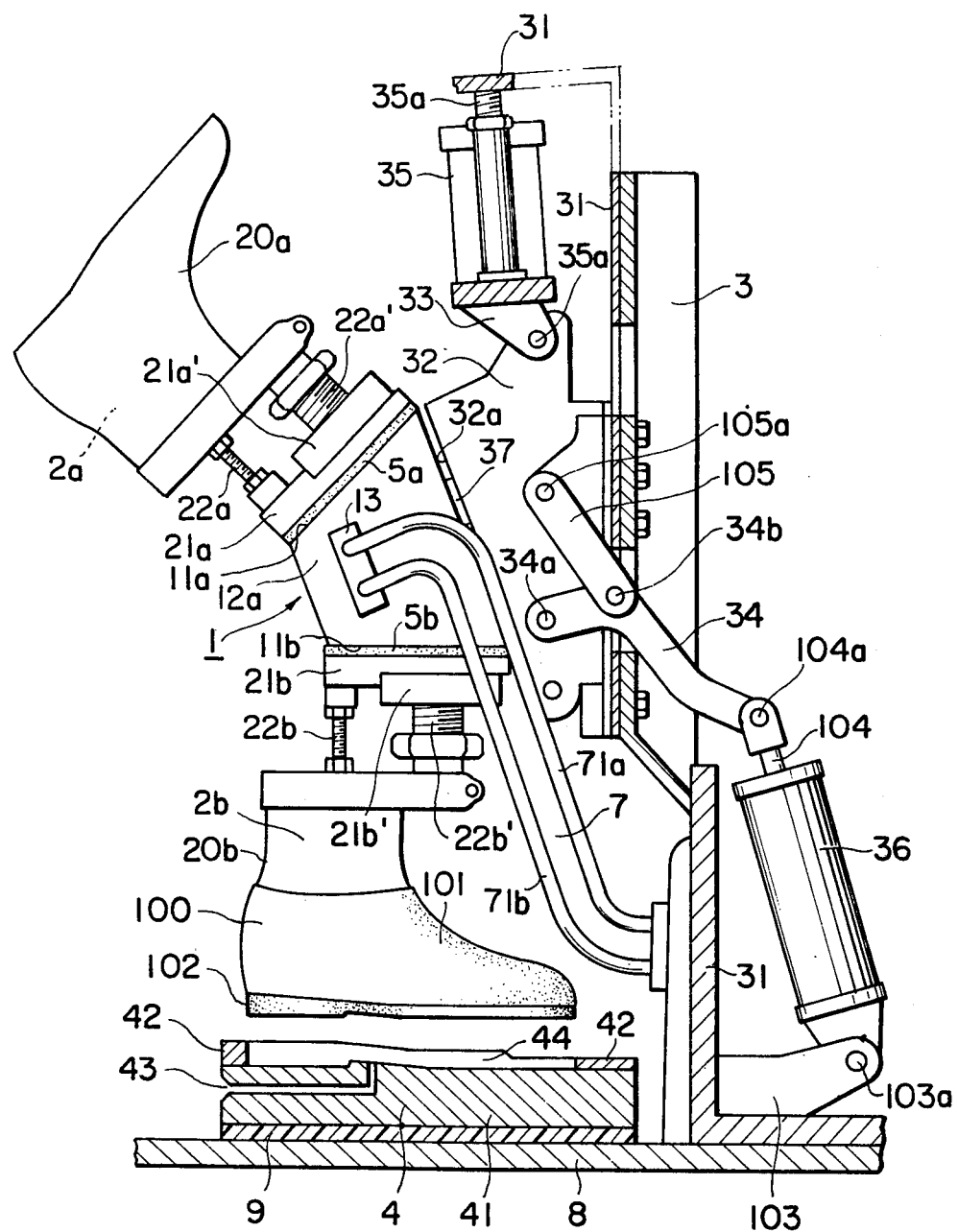
FIG. 1 is a partially sectioned elevational view of the injection molding machine according to the present invention.

In the drawings, numeral 8 represents a stationary machine base plate element from which a machine frame 31 stands rigidly substantially in the vertical direction and a slide 32 is movably mounted on the inside surface of the machine frame. For this purpose, the slide may be formed with a dove-tail projection and the machine frame may be formed with a mating dove-tail groove as in the conventional power lathe, although not specifically shown for avoiding a crowded representation of the drawing.

Numeral 36 is a conventional double-acting hydraulic piston-and-cylinder unit the lower end of which is pivotably supported at 103a on a stationary supporting arm 103 made rigid with the lower part of said machine frame.

Numeral 104 represents a piston rod extending upwardly from the interior of the hydraulic unit 36 which is shown at its fully collapsed state.

The upper end of the piston rod is pivotably connected at 104a to the lower end of a connecting link 34 which is pivotably connected in turn at 34a with the slide 32.

The main link 34 is pivotably connected at 34b with the lower end of an auxiliary link 105, the upper end of which is pivotably mounted at 105a with the slide.

There is a second hydraulic piston-and-cylinder unit 35, outer and upper end of the piston rod of which is rigidly connected with an extended part of machine frame 31 as hinted by two parallel chain-dotted lines shown in FIG. 1. At the lower end at 35a, the unit 35 is pivotably connected with upper end of the slide 32 through a connecting arm 33 made rigid with the unit 35. Each of the hydraulic units is formed naturally with pressure oil supply socket means and oil discharge means which have been, however, omitted from the drawing for simiplicity thereof.

The vertical slide 32 is formed with an inclined surface 32a on which a rotatable head 1 is mounted rotatably through a pivot shaft 37 within the range of 180°. Although not shown, proper mechanical stop means are provided on the machine frame, so as to precisely limit the rotating movement range of the head 1 on the pivot shaft at the terminal ends.

If necessary, however, the second hydraulic unit 35 may be dispensed with.

In this way, a frame side equipment 3 is constituted by machine frame 32; connecting arms 33 and 34; first and second hydraulic units 35 and 36 and pivot shaft 37.

Figure 2:
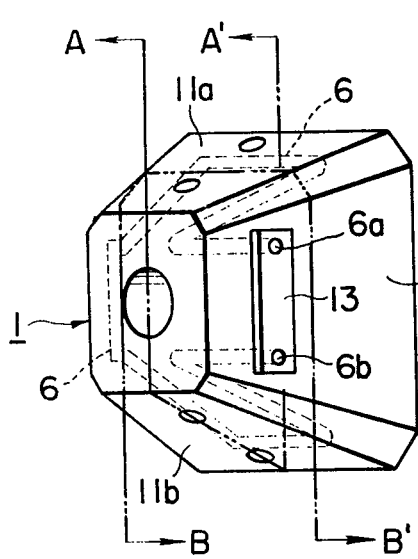
FIG. 2 is a perspective view of a rotatable head of the machine
Figure 3:
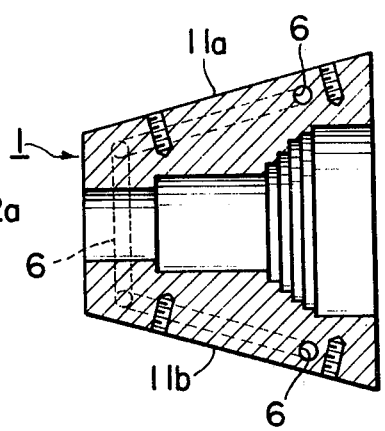
FIGS. 3 and 4 are sectional views of the head taken respectively along section lines A-A' and B-B' shown in FIG. 2.
Figure 4:
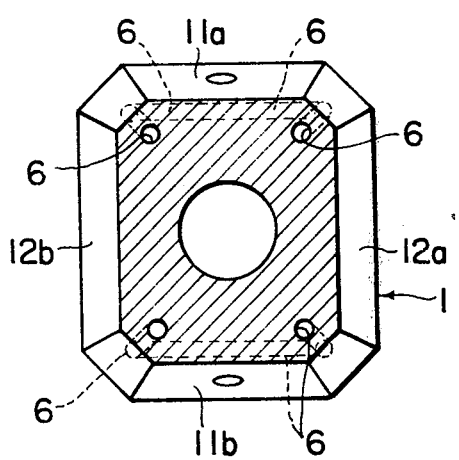

The outline configuration of the head 1 takes substantially a truncated quadrangular pyramid, as specifically shown in FIGS. 2-4. A pair of opposite side surfaces 11a and 11b mount fixedly thereon, respective shoe lasts 2a and 2b. The inclined angle of these side surfaces relative to the central axis of the pyramid is so designed and arranged that when the attached last 2a or 2b to each of these surfaces occupies its downwardly depended position as at 2b in FIG. 1, the related side surface is positioned precisely on a horizontal plane.

A continuous cooling liquid passage or duct system 6 is formed within the material of the pyramid, and the main part of said system is positioned in close proximity to the opposite side surfaces 11a and 11b as seen, for the purpose of effective cooling thereof. The inlet and outlet sockets 6a and 6b of the cooling system are exposedly positioned on one of the remaining opposite side surfaces as at 12a. The other side surface is shown at 12b. These sockets 6a and 6b are mounted in and on a rigid common socket piece 13 which is fixedly, but detachably attached onto the surface 12a, although the attaching means such as bolts, nuts and sealing means have been omitted from the drawing only for simplicity thereof. From these sockets 6a and 6b, flexible tubings 71a and 71b extends, as shown in FIGS. 1 and 5.

Figure 5:
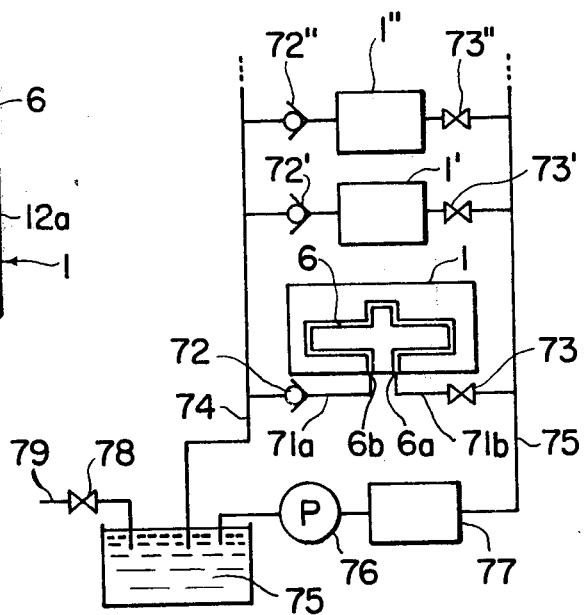
FIG. 5 is a schematic diagram of a cooling system of the machine.

As seen from FIG. 5, inlet flexible tubing 71a is connected via an on-off control valve 73 with a main liquid feeder pipe 75 which leads through a cooler unit 77 and a pump 76 to a liquid reservoir 75. On the other hand, return flexible tubing 71b is connected through a check valve 72 with a main liquid return pipe 74 which leads again to the reservoir 75.

The machine may be fitted with similar heads 1' and 1" as to the foregoing one denoted 1. Or alternatively, these heads 1' and 1" may be provided on a separate similar machine, although such addition or modification has not been specifically shown in FIGS. 1–4, but in FIG. 5 which represents these heads only schematically.

Numerals 72' and 72" are similar check valves as the former one denoted 72 and fitted in respective cooling liquid flowing branches containing respective heads 1' and 1".

Numeral 73' and 73" are similar on-off control valves as the former one denoted 73 and fitted-in for the similar liquid circulation purpose. Numeral 78 represents an on-off control valve inserted in a liquid replenishing pipe 79 for the reservoir 75. In this way, the head(s) 1 and/or 1' and 1" can be effectively cooled by the circulating cooling liquid.

Shoe last structures 2a and 2b comprise respective last propers 20a and 20b and are adjustably mounted on the respective mounting surfaces 11a and 11b which are practically and thermally insulated by insulator sheets 5a and 5b which are made preferably of fluorine-contained rubber material as an example.

For this purpose, the shoe last structures 2a and 2b are provided with respective fixtures 21a;21a' and 21b;21b' which have adjusting and fixing screws 22a;22a' and 22b;22b' for easy exchange of the respective last propers for other one, as occasion may desire. The fixtures are mounted through said insulator sheets on the receiving side surfaces of the truncated cone head 1.

On the base plate 8 and below the rotatable head 1, there is provided a mold assembly 4 adapted for the shoe sole manufacture which comprises a shoe bottom-defining element 41 and a pair of side-shaping elements 42 of which only one is shown in FIG. 1. These elements 41 and 42 are assembled together, as known per se. Numeral 43 represents an inlet duct for force-feed of thermoplastic synthetic rubber material, and formed through part of the bottom element 41, the outlet being opened at the upper surface thereof as shown.

Closure in position of these side elements 42 and holding thereof in position and reopening of the elements into their off-service position is mechanized by means of an auto-mechanically operating mechanism which is not shown by reason of its well-known nature and since it does not constitute any part of the invention. Shoe-bottom or sole-defining cavity of the mold assembly is shown at 44. In the service condition, this cavity 44 is naturally filled with fluidous rubber material fed through the inlet duct 43.

Between the mold assembly 4 and the base plate 8, there is fixedly inserted an insulator sheet, preferably made of synthetic resin material for the prevention of temperature rise in the plate 8 which rise may take place during extended use of the machine.

In practice, it may be preferable to form the base plate 8 into a ring and a plurality of the molding mechanisms, one of which has been illustrated FIG. 1, are arranged and positioned radially thereon, for attaining a mass productive efficiency, although not specifically shown on account of the limited area of the drawing paper. The up-and-down movement of the slides and operational closure and opening of side plates 42 may be automatically carried out in a certain predetermined program, preferably controlled with an electronic program, simultaneously for all molding units, or alternatively in a successive manner.

In the operation, an instep 101 is attached onto one of the last propers as at 20a when it is positioned at its off-service position shown in FIG. 1.

Then, the head 1 is rotated 180°, so as to bring the last proper 20a into its depending service position corresponding to that shown at 20b in FIG. 1.

Then, the hydraulic unit 36 is energized to lower the slide 31, until the last proper is brought into its further service position for providing a closed cavity 44 defined by the co-operative engagement of the related last proper with the sole-molding assembly 4.

Next, fluidous synthetic rubber material is injected under pressure from a supply source, not shown, and through the inlet duct 43 into the cavity. The rubber may be replaced by a synthetic resin as occasion will desire.

When the injected rubber or synthetic resin mass has been cooled down and solidified onto the lower end of the instep, the side members 42 are separated out from each other for opening the mold assembly 4.

Further, the hydraulic unit 36 is reversedly energized for moving the slide 32 upwards a small distance, so as to bring the related last into its elevated off-service position shown at 2b in FIG. 1. Then, the finished shoe 101 having a solidified rubber sole 102 may be separated from the related last structure 2b, and so on.

During repeated and extended use of the machine, a considerable temperature rise will be met with the mold assembly 4, as well as the last structures 2a;2b, substantial amount of heat will be transmitted to the base plate 8, head 1, slide 32 and machine frame 3, if not employed the inventive idea.

If such considerable temperature rise should take place, smoothness of relatively sliding and rotating parts of the machine could be injured by virtue of otherwise invited local thermal expansion of machine parts and of thermal deterioration of lubricating oil serving for smooth mechanical running among the related machine parts.

In the case of the embodiment of the invention so far shown and described, however, the provision of the insulator sheet 9 will effectively prevent heat transmission from the mold assembly 4 to the base plate, and further to the machine frame.

Heat transmission from the last structures 2a;2b to the rotatable head 1 is also effectively prevented by the provision of insulator sheets 5a;5b.

In addition, occasionally invaded heat amount can be effectively carried away by the provision of the liquid circulation cooling system 6 included in the cooler arrangement shown in FIG. 5.

In addition, the off-service positioned last structures are kept always cold, attaching and detaching operations of the instep thereto and therefrom can be carried out without troubles.

We claim:

1. A shoe-injection molding machine for molding a sole and attaching same to a prefabricated instep, said machine comprising: a stationary base plate; at least one sole support assembly mounted on said base plate; a machine frame attached to said base plate; a slide vertically movable on and along said machine frame; a frusto-conical head rotatably mounted on said slide; a plurality of last supporting units adjustably mounted on side surfaces of said head; an insulating sheet between each of said last supporting units and said head; and means for cooling said head, said cooling means comprising a cooling liquid circulating system having coolant passages formed within said head, the main part of said passages being positioned in close proximity to said side surfaces on which said last supporting units are mounted, said system having inlet and outlet sockets positioned in close proximity to each other on a further side surface of said head, means operable to supply a cooling liquid to said inlet socket, and means operable to remove liquid from said outlet socket.

2. A shoe-injection molding machine as claimed in claim 1 wherein said means operable to supply a cooling liquid to said inlet socket comprises: a liquid reservoir; a cooler unit; a cooling pump; a main liquid feeder pipe connecting said reservoir, cooling pump, and cooler unit; flexible tubing having one end attached to said inlet socket, and the other end attached to said main liquid feeder pipe, and an on-off control valve operatively associated with said flexible tubing; and said means operable to remove liquid from said outlet socket comprises a main return pipe connected to said reservoir, flexible tubing having one end connected to said outlet socket, and connecting means including a check valve for connecting the other end of the flexible tubing to said main return pipe.

3. A shoe molding machine as claimed in claim 2 wherein said inlet and outlet sockets are mounted in a common socket piece releasably attached to a side surface of said head.

4. A shoe molding machine as claimed in claim 2 wherein said means operable to supply a cooling liquid further comprises a liquid replenishing pipe connected to said reservoir, said pipe containing means for maintaining the level of liquid in the reservoir at a predetermined level.

5. The shoe-injection molding machine according to claim 1, characterized by that an insulating sheet is provided between said sole mold assembly and said base plate.

6. The shoe-injection molding machine according to claim 1, characterized by that said cooling means is made in common to a plurality of similar heads including said head.